USO11278969B2

(12) United States Patent
Haimer

(10) Patent No.: US 11,278,969 B2
(45) Date of Patent: Mar. 22, 2022

(54) COLLET CHUCK

(71) Applicant: Franz Haimer Maschinenbau KG, Hollenbach-Igenhausen (DE)

(72) Inventor: Franz Haimer, Hollenbach-Igenhausen (DE)

(73) Assignee: FRANZ HAIMER MASCHINENBAU KG, Hollenbach-Igenhausen (DE)

( * ) Notice: Subject to any disclaimer, the term of this patent is extended or adjusted under 35 U.S.C. 154(b) by 0 days.

(21) Appl. No.: 15/556,481

(22) PCT Filed: Mar. 9, 2016

(86) PCT No.: PCT/EP2016/055047
§ 371 (c)(1),
(2) Date: Sep. 7, 2017

(87) PCT Pub. No.: WO2016/142431
PCT Pub. Date: Sep. 15, 2016

(65) Prior Publication Data
US 2018/0071833 A1 Mar. 15, 2018

(30) Foreign Application Priority Data
Mar. 10, 2015 (DE) .......................... 102015002943.6

(51) Int. Cl.
*B23B 31/20* (2006.01)
(52) U.S. Cl.
CPC .......... *B23B 31/201* (2013.01); *B23B 31/208* (2013.01); *B23B 2231/06* (2013.01);
(Continued)

(58) Field of Classification Search
CPC ................ B23B 31/201; B23B 31/208; B23B 2231/2005; B23B 2231/2027; B23B 2231/06; B23B 2231/2083
See application file for complete search history.

(56) References Cited

U.S. PATENT DOCUMENTS 3,734,513 A * 5/1973 Kanebako ............... B23B 31/20
279/48
2009/0322042 A1* 12/2009 Kitamura .............. B23B 31/202
279/49

(Continued)

FOREIGN PATENT DOCUMENTS

DE 1477279 A1 * 10/1969 ............. B23B 31/20
DE 4118376 A1 12/1991
(Continued)

OTHER PUBLICATIONS

Office action dated Jan. 22, 2016 in related German application 10 2015 002 943.6.

*Primary Examiner* — Eric A. Gates
*Assistant Examiner* — Paul M Janeski
(74) *Attorney, Agent, or Firm* — Polson Intellectual Property Law, PC; Margaret Polson; Christopher Sylvain

(57) ABSTRACT

The invention relates to a collet chuck (1) for clamping a preferably cylindrical tool shank with a chuck body (2) of a collet (3) and an union nut (4), which are matched in such a way that the collet (3) can be driven into the chuck body (2) by tightening the union nut (4) such that it secures the tool shank in the collet chuck (1) ready for operation, wherein the collet (3) and the union nut (4) are permanently connected to one another and at the same time connected in a rotatable manner relative to one another.

40 Claims, 6 Drawing Sheets

(52) U.S. Cl.
CPC ............ *B23B 2231/2005* (2013.01); *B23B 2231/2027* (2013.01); *B23B 2231/2083* (2013.01)

(56) References Cited

U.S. PATENT DOCUMENTS

| | | | |
|---|---|---|---|
| 2015/0028548 A1* | 1/2015 | Haimer | ............ B23B 31/005 |
| | | | 279/4.06 |
| 2016/0221086 A1 | 8/2016 | Haimer | |

FOREIGN PATENT DOCUMENTS

| | | | | |
|---|---|---|---|---|
| DE | 4440697 | A1 | 5/1996 | |
| DE | 69515672 | T2 | 9/2000 | |
| GB | 2170125 | A * | 7/1986 | ........... B23B 31/113 |
| WO | WO-9817430 | A1 * | 4/1998 | ........... B23B 31/201 |
| WO | WO-9921672 | A1 * | 5/1999 | ........... B23B 31/201 |

\* cited by examiner

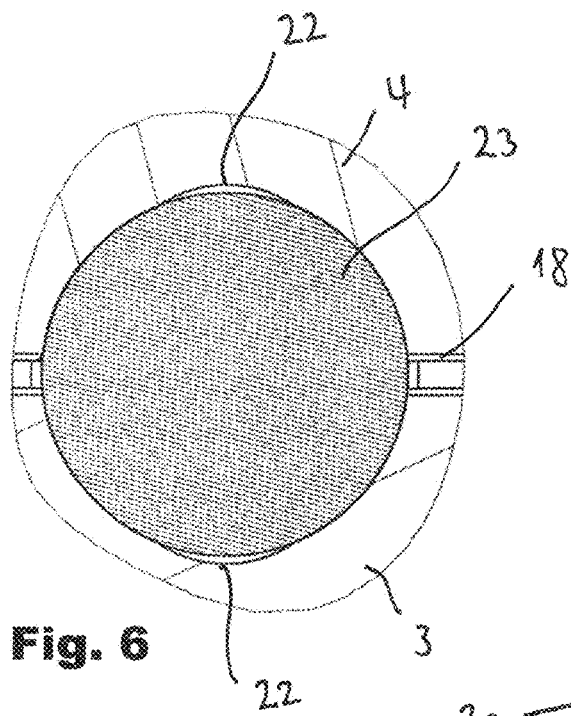
Fig. 6
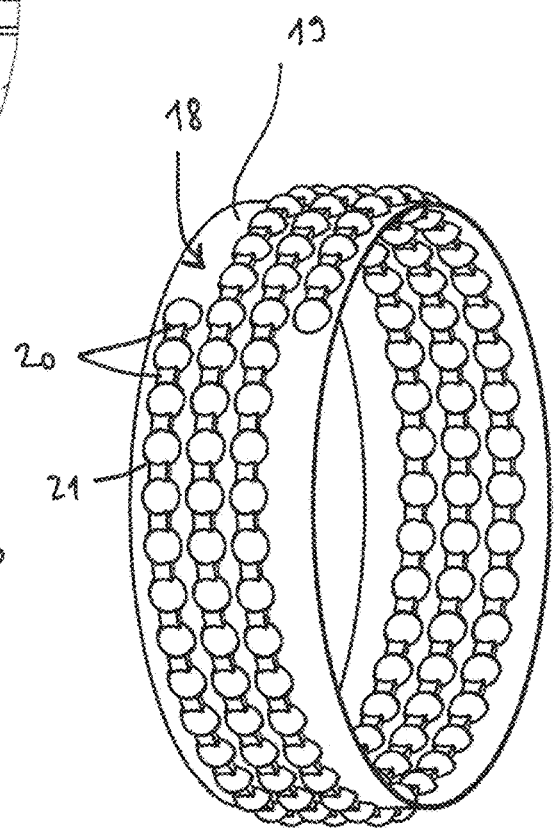
Fig. 7
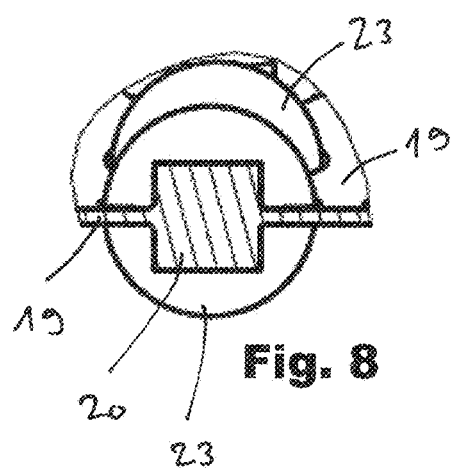
Fig. 8
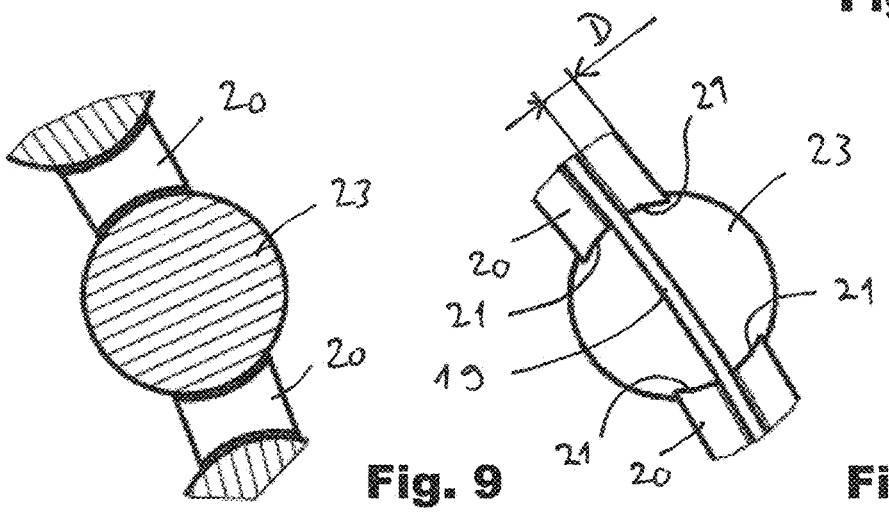
Fig. 9
Fig. 10

COLLET CHUCK

SUBJECT OF THE INVENTION

The invention relates to a collet chuck according to the preamble to claim 1, which is used for chucking a preferably cylindrical tool shaft and has a chuck body, a receiving sleeve, and a screw cap, which are matched to one another in such a way that by tightening the screw cap, the receiving sleeve can be driven into the chuck body so that it fixes the tool shaft in the collet chuck in a ready-to-operate fashion.

PRIOR ART

It is known that tools, especially rotary tools for use in milling machines with a chucking device, must be fastened to the spindle. On the one hand, a typical chucking device of this kind has a tool holder whose one end has a common interface with the spindle. Examples of these standardized forms are the hollow-shaft cone, HC for short, or the steep cone, SC for short. The rotational axis of the tool holder and of the tool with the spindle here should, to the greatest extent possible, be congruent in order to avoid an imbalance.

On the other hand, a typical chucking device has a chucking region for the actual tool. This chucking region is provided by the chuck, which is positioned at the end opposite from the spindle. This chucking region can be embodied in various ways. Commercially available forms include, for example, the shrink-fit chuck or hydraulic collet chuck, which hold a tool in a nonpositive, frictional way through a change of the diameter in the chucking region. In these cases, the chucking region is thus embodied in the form of a cylindrical bore, which is oriented on the diameter of the tool shaft that is to be chucked.

The so-called collet chuck has become established as the commercially available alternative. Such a chuck is not embodied in the form of a cylindrical bore; the chucking region is embodied by means of a conical contact surface that tapers in the direction of the spindle. For use in a collet chuck, the tool is first inserted into a so-called receiving sleeve, which on the one hand, has a cylindrical receiving bore in the middle for the tool and on the other hand, has conical outer surfaces for contact in the collet chuck. The receiving sleeve is inserted, together with the tool, into the chuck of the tool holder and is then pressed into the chuck, usually with the aid of a screw cap. The screw cap itself engages with an external thread provided for it on the tool holder. The screw cap is moved axially by means of a rotary motion. Due to its conical shape, the receiving sleeve is compressed more, the further it is pressed into the chuck. This elastic deformation in turn constricts the receiving bore, allowing a tool contained in it to be held in a non-positive, frictional, and form-fitting way. The advantage relative to shrink-fit chucks and hydraulic collet chucks lies in the fact that tools with different shaft diameters can be chucked in the same tool holder by changing the receiving sleeve. The disadvantage of the known designs lies in the fact that with the loose insertion of the receiving sleeve into the chuck body and the subsequent separate placement and tightening of the screw cap, it is not always possible to ensure an optimal centering of the receiving sleeve relative to the screw cap and the chuck body and in practice, this is always detrimental to precision and concentricity.

The fault tolerances of the individual parts, which multiply, play a role in this context.

Another important factor here is that as a rule, at the beginning of the tightening of the screw cap, the receiving sleeve only has a centering projection on its end oriented away from the screw cap and already at this early stage, this projection provides a pre-centering relative to the chuck body. This centering projection, however, is unable at this point to also sufficiently ensure that the receiving sleeve is centered enough at its end oriented toward the screw cap.

The Problem Underlying the Invention

The object of the invention is to disclose a collet chuck, which, with simple means, achieves improvements with regard to the precision and concentricity.

Solution

This object is attained with the features of claim 1. The solution according to the invention is thus achieved by means of a collet chuck for chucking a preferably cylindrical tool shaft, which has a chuck body, a receiving sleeve, and a screw cap. These components are matched to one another so that by tightening the screw cap, the receiving sleeve can be driven into the chuck body so that it affixes the tool shaft in the collet chuck in a ready-to-operate fashion.

In any case, the tool shaft is "ready-to-operate" if the torque that is required in order to be able to operate using the system composed of the collet chuck and the tool can be transmitted between it and the receiving sleeve without the tool shaft slipping in the circumference direction. Ideally, the expression "ready-to-operate" is even understood in a narrower sense. It then signifies a fixing of the cylindrical tool shaft, which simultaneously also eliminates vibration-induced micro-movements that can add up to a drifting of the tool shaft in the axial direction. A form-fitting pull-out prevention element can be involved in all of this, but preferably, at least the preponderance of all of the necessary forces is exerted by means of non-positive, frictional engagement.

The invention features the fact that the receiving sleeve and the screw cap are permanently connected to each other and at the same time, are able to rotate relative to each other.

As a rule, a connection as defined by the invention is only a direct connection between the screw cap and the receiving sleeve, without the interposition of a disc, which constitutes a separate component in relation to these components and is rotationally secured to the chuck body if possible. Ideally, the ready-to-operate screw cap is embodied of one piece.

A permanent connection as defined by the invention exists in any case when the receiving sleeve and screw cap can no longer be completely detached from each other in a nondestructive way.

Preferably, however, a permanent connection of the receiving sleeve and the screw cap also exists when the receiving sleeve and the screw cap, in the state in which they are jointly removed from the chuck body, also cannot be completely detached from each other without tools—possibly because a snap ring must be removed beforehand or because one or more retaining screws, screw plugs, rivets, or weld points on the screw cap must be removed in order to gain access to a bearing component between the screw cap and the receiving sleeve, enabling disassembly.

Because they are produced by the manufacturer and sold as an already existing group, the components can be assembled with particular precision and matched to one another, possibly also through the provision of a selective fit. In a non-compulsory embodiment, however, the respective elements can nevertheless be detached from one another, preferably nondestructively, in a separate process outside of their operational use in production—for example in order to permit repair work and replacement of damaged parts.

According to the invention, the permanent connection of the receiving sleeve and the screw cap achieves a compulsory centering or pre-centering of these two components relative to each other so that even when they are assembled carelessly, a high precision and outstanding concentricity can be achieved—with simultaneously good damping by means of the receiving sleeve.

Other features that should also be stressed are the particularly compact design that can be achieved with the embodiment according to the invention and the possibility of easily achieving an adjustable length and the possible flat contact of the screw cap against the chuck body.

Other advantageous embodiments are described in the dependent claims.

The decisive disadvantage of conventional collet chucks lies in the fact that the resistance—and in particular, the torque resistance—of the non-positive, frictional chucking of the tool shaft in such collet chucks tends to be lower than the torque resistance that can be achieved with the non-positive, frictional chucking of the tool shaft in a shrink-fit chuck. This is disadvantageous particularly in high-speed chucking (HSC). In addition, because of their design, shrink-fit chucks also inherently ensure a very good concentricity.

In order to compensate for this weakness of the collet chuck, which has long been known and is found to be unsatisfactory, various solution concepts have been proposed in the prior art, which do in fact remedy this, but do so at the price of other disadvantages.

DE 10056729 A1 proposes a collet chuck, which has an integrated chucking mechanism that operates with a linkage that is able to produce powerful forces. These are sufficient to pull the receiving sleeve—by means of a gripper that acts on its end oriented away from the tool end—into the chuck body and thus to fix it in position.

This mechanism for pulling in the receiving sleeve, however, is complex in design, very susceptible to soiling, and because of its design, also results in an imbalance of the collet chuck, which must be separately compensated for.

Because of this, the suggestion is made at another point to provide the receiving sleeve with an outer cone, which in comparison to the conventional collet chucks to be chucked by means of screw caps, is reduced in size in such a way that a self-locking occurs between the receiving sleeve and the chuck body. With the aid of an external press, the receiving sleeve is then driven into the chuck body so firmly that it holds the tool shaft with a similar degree of rigidity as a shrink-fit chuck. Because of the above-mentioned self-locking, the receiving sleeve maintains the position in the chuck body into which it has been driven by the press. The screwing-on of a screw cap can be omitted or takes place optionally as an additional securing measure. The obligatory use of a press for removing the tool again is laborious and also makes the system more expensive since it is necessary not only for producing a sufficient number of collet chucks, but also for producing the press. Because of this, there is a need for collet chucks that perform the same as the special collet chucks described above, but are easier to operate.

This problem is solved with the additional features of claim 2; protection is also claimed for claim 2, which protection is independent of the features of claim 1.

Accordingly, the receiving sleeve and screw cap are supported against each other in rotary fashion by means of rolling elements, preferably with a barrel-shaped, conical, or cylindrical design. The rolling elements each roll against the receiving sleeve and the screw cap so that the screw cap and receiving sleeve act on each other directly via the rolling elements without an interposed disc or an interposed ring that is attached to the chuck body in a rotationally secured way if possible. Preferably, at least 8 rolling elements or better still, at least 10 or 12 of them are provided at each bearing point.

This surprisingly simple and unorthodox measure significantly reduces the friction between the receiving sleeve, which is rotationally secured in the chuck body, and the screw cap, which is screwed onto the chuck body in order to close the receiving sleeve jaws. This makes it possible to convert all of the torque exerted on the screw cap into a force that acts in the direction of the working rotational axis of the chuck body and drives in the receiving sleeve in a particularly firm way.

This solution has turned out to be particularly advantageous in collet chucks that use receiving sleeves with a reduced cone angle—because it avoids scoring damage on the contact surfaces between the screw cap and the receiving sleeve even though the screw cap must be tightened to a considerable degree, with a powerful exertion of force between it and the receiving sleeve, in order to achieve the extraordinary chucking force. With the aid of the invention, it has for the first time been possible to produce collet chucks with receiving sleeves that have a particularly acute cone angle relative to the longitudinal axis of the chuck and can nevertheless be chucked without a special device, just by tightening the screw cap.

It is particularly advantageous if the collet chuck has a set of rolling elements in a V-shaped arrangement whose rolling elements are arranged so that the orthogonals to the rotational axes of the rolling elements only intersect with the chuck longitudinal axis or working rotational axis of the chuck body on the inside of the chuck body. Ideally, the angle that the above-mentioned orthogonals form relative to the chuck longitudinal axis or working rotational axis lies in a range between 25° and 55°.

Such an angular arrangement of the rolling elements results in a particularly good fine centering of the screw cap on the collet chuck that occurs in compulsory fashion during the tightening of the screw cap. This is because the rolling elements do in fact roll on both sides during the tightening of the screw cap and, under the influence of the increasing force, roll in such a way that an optimal centering occurs automatically—unlike in known collet chucks, where this is prevented or at least hindered by the powerful frictional forces.

Preferably, the collet chuck is embodied so that it has a second set of rolling elements in a V-shaped arrangement whose rolling elements are arranged so that the orthogonals to the rotational axes of the rolling elements only intersect with the chuck longitudinal axis or working rotational axis of the chuck body on the outside of the chuck body, preferably enclosing the same angle with the chuck longitudinal axis or working rotational axis as the above-mentioned first set of rolling elements. This makes it possible to drive the receiving sleeve—which would otherwise automatically remain in position in the chuck body mostly under the influence of friction forces—outward by unscrewing the screw cap out of the chuck body again and thus opening the latter.

Also independent of the V-shaped arrangement described in greater detail above, it is thus advantageous if the rolling elements form a roller bearing, which permits the receiving sleeve holding a tool shaft to be pressed into the chuck body and pulled out from it again by screwing and unscrewing the screw cap.

Optionally, the collet chuck is embodied so that the rolling elements are installed between the receiving sleeve and the screw cap, without a bearing cage. This embodiment makes it possible to construct a very compact chuck, without particular regard as to how the rolling elements are mounted. For the installation of the rolling elements, the screw cap is preferably provided with only one local opening that is of such a size that the rolling elements can only be slid or rolled one after another through it and into the running channel that accommodates them between the receiving sleeve and the screw cap. Such an opening only results in a slight weakening and can be easily closed, e.g. by means of a screw plug, a press-fitted plug, or a closure that is glued into place or thermally fastened (welded/soldered), preferably in the form of a pin.

In another advantageous embodiment option, the collet chuck has a receiving sleeve with a collar, which protrudes radially beyond the receiving sleeve body, and the collar has a running track for the rolling elements on its outer circumference surface, preferably in the form of a flute provided in it. This is the simplest way to produce a finely machined running track since as a rule, the receiving sleeve has to be ground anyway and the grinding of the running track therefore does not entail an important amount of additional effort.

In this connection, it is necessary to ensure that the receiving sleeve is not slit in the region in which the running track for the rolling elements is embodied. In other words, unlike conventional embodiments, a receiving sleeve according to the invention that is embodied in this way is specifically not slit all the way into its end oriented toward the screw cap.

In another preferred embodiment, the receiving sleeve is rotationally secured relative to the chuck body through form-fitting engagement.

It is particularly advantageous if the receiving sleeve has at least one section that achieves a rotational securing, with a non-round and/or polygonal outer contour or with a locking groove, a locking element, or a locking projection and the chuck body is embodied as complementary to it.

By means of such non-round and/or polygonal contact surfaces between the receiving sleeve and tool holder, it is even possible to prevent a rotary motion of the receiving sleeve section during the chucking movement of the screw cap section. Optionally, the receiving sleeve can be embodied as non-round and/or polygonal over its entire length. A natural advantage of this, of course, is a torque-resistant bracing of the receiving sleeve during the machining process.

The rotational securing according to the invention does not necessarily have to be embodied in the form of a non-round and/or polygonal section. Such an effect can also be achieved through the cooperation of a locking element and locking groove. In such an alternative embodiment, the receiving sleeve has a locking groove that also has a longitudinally extending part, i.e. oriented in the same direction as the rotational axis of the tool, as well as a transversely extending part, i.e. oriented transversely to the rotational axis of the tool.

Such a design could, for example, be a groove that extends obliquely in a developed view; it would also be conceivable for it to have a multiply oscillating curve (S-shaped) or for it to have the shape of a bayonet coupling (L-shaped).

In such a design, it is particularly advantageous if the locking groove begins at the rear end, i.e. on the side that is oriented away from the screw cap section. It is thus possible to insert the group according to the invention without having to remove a locking element.

The locking elements or locking projections can be embodied in different ways, for example as set screws, which are fastened in the tool holder, protrude into the chucking region, and protrude into the groove in the receiving sleeve section of the group. In a particularly advantageous design, however, the locking elements are embodied of one piece with/integrally joined to the tool holder and protrude into the chucking region in the form of pins that extend obliquely relative to the rotational axis. It goes without saying that a reverse design is also possible, i.e. the receiving sleeve has the locking elements while the locking grooves are provided in the holder.

It is particularly advantageous if the end of the receiving sleeve oriented away from the screw cap has an opening for a length-adjusting screw.

Preferably, the receiving sleeve is equipped with a collar, which, in the chucked state, rests flat against the end of the chuck body. In addition to or instead of this, the screw cap can have an inner end, which, in the chucked state, rests flat against the end of the chuck body.

In a particularly preferred embodiment, a multi-start thread and/or a thread embodied as a trapezoidal thread or ball screw thread is provided on the chuck body and in the screw cap in order to be able to screw-connect these parts to each other.

In this case, at least one of the two thread flanks of a thread can form an angle relative to the tool axis of between 85° and 90° or this angle can even be essentially 90°.

By means of these embodiment measures, the collet chuck is provided with a thread that can be used to exert a particularly powerful force in the direction of the chuck longitudinal axis or working rotational axis.

One advantageous embodiment option lies in the fact that at its outer circumference between its end [and] an external thread for the screwing-on of the screw cap, the chuck body has a damping element, which ideally encloses the chuck body in annular fashion at its outer circumference.

In addition or alternatively, the chuck body can have a damping element at its end oriented toward the screw cap.

By the above-explained means, the screw cap comes to rest against the chuck body in a cushioned fashion, which results in a damping of or positive influence on the vibration behavior of the collet chuck.

Another preferred embodiment is designed so that the chuck body has a contact surface on its outer circumference, which interacts with a corresponding matching contact surface on the inside of the screw cap and thus centers the screw cap in a form-fitting way relative to the chuck body. Such an embodiment is useful not least when the thread between the chuck body and the screw cap is embodied, for example, as a trapezoidal thread or another type of thread with a reduced self-centering function since this ensures a centering that is independent of the thread.

Whereas the inner cone of the chuck body tapers toward the spindle end, the outside of the chuck body can have a conical form that tapers toward the tool end. The tool holder can therefore be embodied as slimmer. It goes without saying that the screw cap section of the group that rests against such a conical region of the tool holder, at least at the end oriented toward the rotational axis, has a corresponding conical design so that this preferably in turn results in a centering of the screw cap. In a particularly preferred embodiment, however, the outer contour of the screw cap, at least in sections over most of its span along the working rotational axis, also has a conical design, which tapers toward the tool holder end.

In a particularly advantageous embodiment, the receiving sleeve and/or the screw cap and/or the chuck body, preferably at least in the region in which they come into contact with one another in a form-fitting way, is/are provided with an electrically non-conductive coating to improve the mechanical properties. In particular, a shape-memory alloy and/or a sliding coating and/or a wear-protection coating can be used here, for example a carbon coating or another hard coating.

The coating of the chuck body and/or the receiving sleeve and/or the screw cap can be different. In particular, the receiving sleeve and/or the screw cap can each have several different coated regions. This can conceivably be a wear-resistant coating of the receiving sleeve and screw cap in the region in which the screw cap and receiving sleeve interact with each other. The running surfaces for the rolling elements between the screw cap and the receiving sleeve can therefore be provided with a wear-resistant coating. Another coating can be provided in the region of the outer circumference surface of the receiving sleeve in which the receiving sleeve interacts with the chuck body. This could be a friction-reducing coating in order to thus be able to drive the receiving sleeve as deep as possible into the receiving sleeve with the available means and thus to generate an increased pressing force between the tool shaft and the receiving sleeve. A similar coating can be provided on the inside of the chuck body in the region of its cone; preferably, only the comparatively more easily accessible outer circumference surface of the receiving sleeve is coated.

It is particularly advantageous if the receiving sleeve has at least two different types of slit, in particular slits that differ in terms of their length in the direction parallel to the longitudinal axis of the receiving sleeve.

Ideally, the region of the receiving sleeve in which a running surface for rolling elements is embodied on the receiving sleeve is not slit, instead forming a continuous, intrinsically closed ring in the circumference direction.

It is particularly preferable for the receiving sleeve to have a form-fitting pull-out prevention element by means of which it can interact with a complementary pull-out prevention element on the tool shaft, thus providing a pull-out prevention function for the tool.

The invention then turns out to be particularly effective not least when the conical surface by means of which the receiving sleeve is compressed by the chuck body has a cone angle of 0.5° to 4°, preferably 1° to 3°. A chuck with these angular dimensions has a significantly more powerful clamping force than the often-used, so-called "ER chuck," as is known from the prior art. To a particularly high degree, this achieves a synergistic effect if at the same time, roller bearings are used between the screw cap and the receiving sleeve: by tightening the collet nut, which in this case, only produces reduced friction losses, it is possible to produce an increased closing force, which, because of these particularly advantageous angular ratios, can be converted into a particularly powerful pressing force on the tool shaft, as is required in order to securely hold the tool shaft, for example in HSC.

Optionally, the chuck body in this case can have a receiving sleeve socket with an inner cone whose cone angle is less than or equal to that of the outer cone of the receiving sleeve.

Protection is claimed not just for a chuck that has a chuck body, a receiving sleeve, and a screw cap. Instead, independent protection is also claimed for such a chuck, which—through the integration of a tool that fits and is possibly individually adapted by means of the form-fitting pull-out prevention element—has become a working unit for a machine tool that particularly operates by means of material-removing machining. Protection is also claimed for a subject that is disclosed in claim 17, but without features that claim 17 includes merely through its dependency on preceding claims. This subject can optionally be provided with other features of claims 17-23. In this connection, it is not absolutely necessary to incorporate features that are only present through the dependency of claims 17 to 23. This means that fully independent protection is also claimed for a chuck body on which a screw cap is supported in rotary fashion by means of rolling elements with the interposition of a rolling element cage and this screw cap is able to drive a receiving sleeve into a conical seat of the chuck body. It is particularly advantageous, however, if in this "embodiment with a roller bearing cage," a combination is carried out with the connection according to the invention between the receiving sleeve and the screw cap.

Independent protection for a receiving sleeve assembly is then also claimed for the incorporation into the collet chuck according to the invention, which is composed of a receiving sleeve and screw cap that are permanently connected to each other and at the same time, are able to rotate relative to each other.

Finally, independent protection is also claimed for a tool-chucking system, which has a collet chuck according to the invention and at least two receiving sleeve assemblies according to the invention; the receiving sleeve assemblies have receiving sleeves whose tool-chucking regions have different inner diameters. Such a system has the advantage that it is possible to chuck different shaft diameters using one and the same chuck body.

Other possible embodiments, operating modes, and advantages of the invention ensue from the following explanation of an exemplary embodiment based on the figures.

LIST OF FIGURES

FIG. 6 shows another enlarged detail of the region of a rolling element in a flute in the screw cap and the matching flute in the chuck body.

FIG. 7 shows a view of the rolling element cage of the second exemplary embodiment.

FIG. 8 is a sectional view along the section line labeled with the letters AA in FIG. 7.

FIG. 9 is a sectional view along the section line labeled with the letters BB in FIG. 7.

FIG. 10 shows a detail of a side view of FIG. 7.

EXEMPLARY EMBODIMENTS

Figure 1:
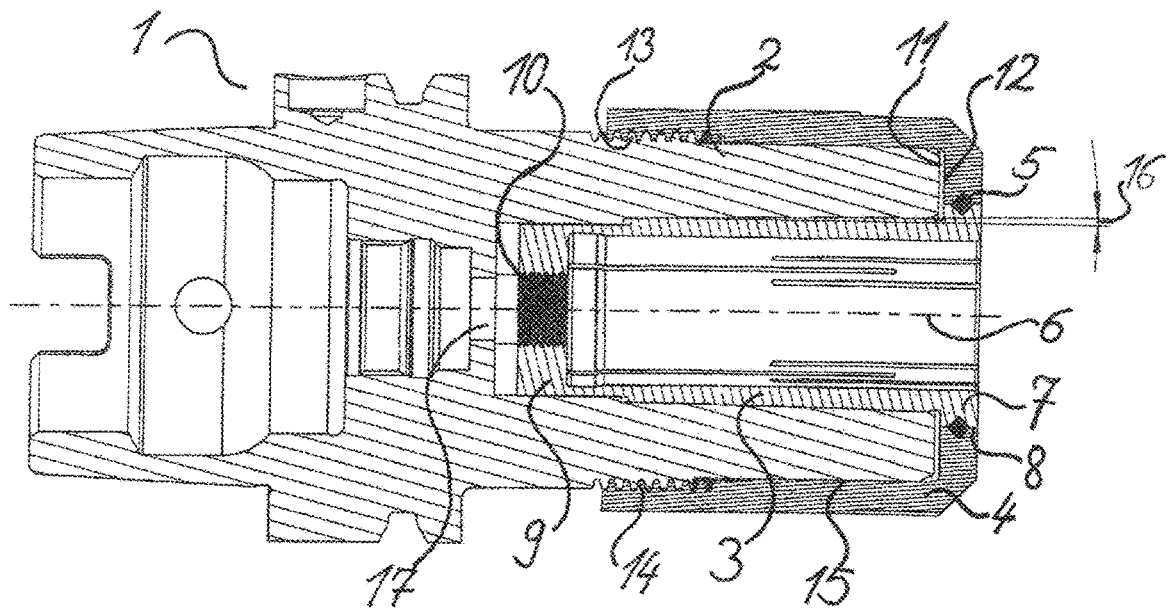
FIG. 1 is a sectional view of a first exemplary embodiment of the collet chuck.

FIG. 1 shows the collet chuck (1) according to the invention in the chucked state, without showing the tool.

The screw cap 4 has already been tightened until the receiving sleeve 3 has been almost completely driven into the chuck body 2.

It is clear how the receiving sleeve and screw cap are permanently connected to each other and at the same time, are able to rotate relative to each other. Between the receiving sleeve and the screw cap, which in this case, each have a rolling element running surface in the form of a flute that is machined into it—which flute has a V-shaped cross-section in the specific case—, a number of rolling elements 5 are provided, which produce a form-fitting engagement between the screw cap and the receiving sleeve.

Figure 3:
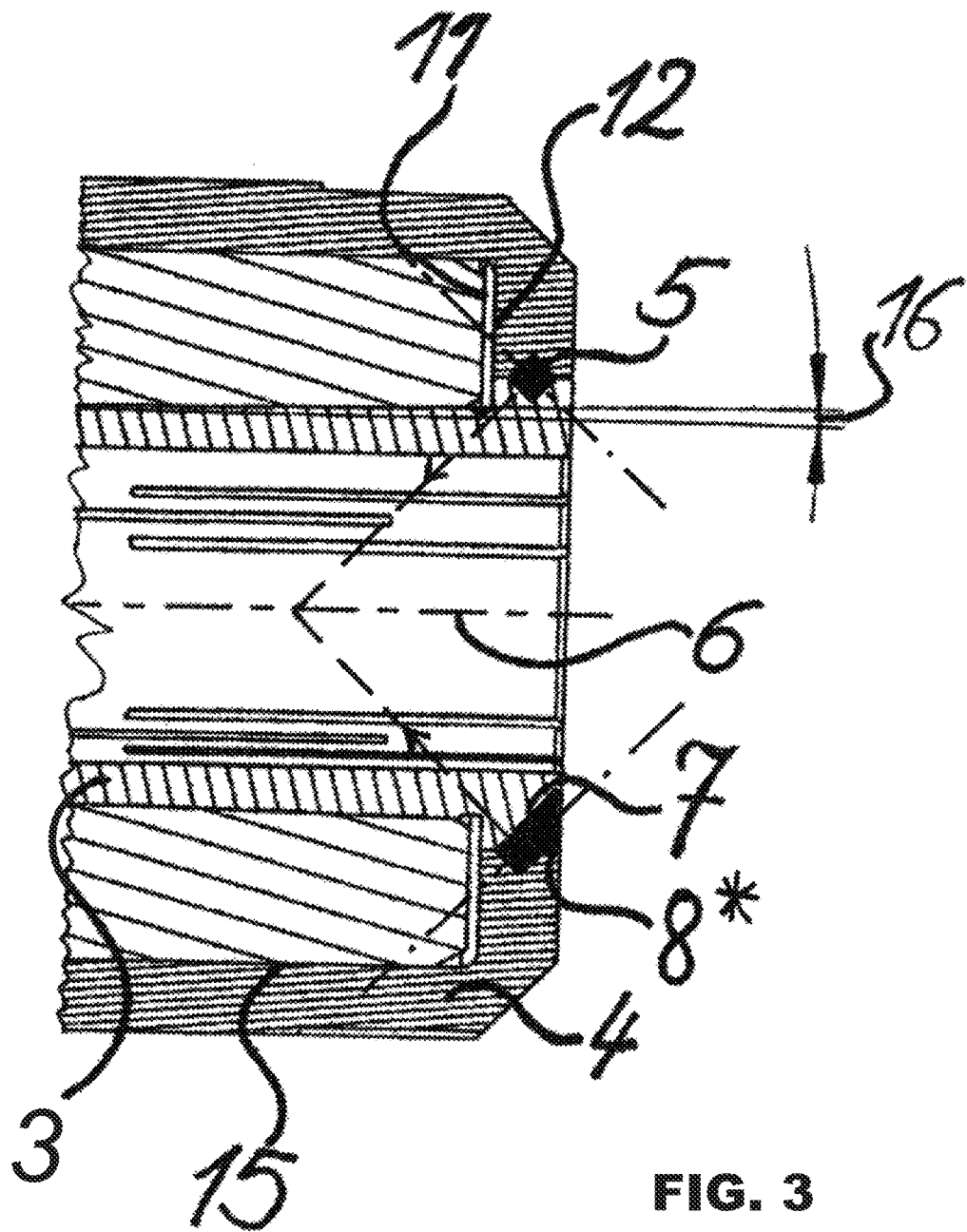
FIG. 3 is an enlarged detail from FIG. 1.

More details are shown in FIG. 3, which shows an enlarged detail from FIG. 1.

Each of the rolling elements rotates around its rotational axis, which is depicted with a dot-and-dash line. As is clear, the long-dashed orthogonals to these rotational axes intersect with the working rotational axis on the inside of the chuck body. The flow of force that is transmitted by means of form-fitting engagement from the screw cap to the receiving sleeve takes place in the arrow direction along the above-mentioned orthogonals.

The rolling elements and the flutes that accommodate them are embodied so that they hold the screw cap and the receiving sleeve against each other with a small amount of play or—because of the transition fit or a slight prestressing force that is already present in the unstressed state—with the play eliminated, i.e. they at least produce a pre-centering of these components relative to each other.

It also stands to reason based on what is shown in the figures that another improvement of the centering occurs as soon as the rolling elements between the screw cap and the receiving sleeve start to roll during the tightening of the screw cap. With a "steel on steel, ground" rolling, only friction-induced cornering forces occur, which are unable to prevent the rollers from moving into an optimally centered position.

The reference numeral 8* in FIG. 3 indicates a closure element. This closure element lies outside the main flow of force between the screw cap and the collet chuck, extending through the rollers. The closure element could be a ring extending in the circumference direction that has been glued or welded into place after the insertion of the rolling elements. Preferably, the closure element has only a limited spatial dimension and closes an opening that is only large enough that it is only ever possible to insert one rolling element after another into the "running channel" composed of the flutes between the screw cap and the receiving sleeve—for example through a movement parallel to the dot-and-dash axis line.

This illustrates very clearly what the expression "permanently connected to each other" means: in the normal production application, e.g. on material-removing machines in the production sector, the connection between the screw cap and the receiving sleeve is not detached. At most, it is detached when the bearing is defective and must be overhauled.

Both the receiving sleeve 3 and the receiving sleeve socket in the chuck body 2 are embodied as conical in this case. Typically, the cone angle in this case encloses an angle of 0.1° to 4°, preferably an angle of 0.5° to 3° with the rotational axis 6.

The remaining gap between the end 11 of the chuck body 2 on the one side and the collar 7 of the receiving sleeve 3 and the end 12 of the screw cap 4 on the other side better shows the damping properties of the collet chuck 1.

A collar 7 is understood to be any region of the receiving sleeve 3 that protrudes in the radial direction, i.e. transverse to the rotational axis 6. In this case, the collar 7 has an outer circumference surface 8, which either directly adjoins the screw cap 4 or, like the screw cap 4, has recesses in order to accommodate the rolling elements 5.

Through further tightening of the screw cap 4, the collar 7 of the receiving sleeve can be moved until it comes into flat contact against the end 11 of the chuck body 2.

In this case, the external thread 13 on the chuck body 2 and the internal thread 14 in the screw cap 4 that are required for this movement are embodied as trapezoidal threads.

The region between the external thread 13 of the chuck body 2 and the end 11 of the chuck body 2 is embodied as a mating surface 15 between the screw cap 4 and the chuck body 2, with the screw cap 4 being guided in a precise fashion during the insertion since a trapezoidal thread exhibits only a reduced centering action.

Since the receiving sleeve 3 does not rotate along with this rotary motion and/or is rotationally secured even when subjected to stress, the rear region has a section with a polygonal outer contour 9, which engages in a section of the chuck body 2 that is embodied as complementary thereto.

Likewise in the rear region, there is an opening 10 for an optional length-adjusting screw; when the screw is not inserted, the opening 10 can also be used to convey coolant and/or lubricant that is/are introduced via the through bore 17. Naturally, this through bore 17 is also used for re-tightening a length-adjusting screw as needed in order to optimally adjust a tool.

Figure 2:
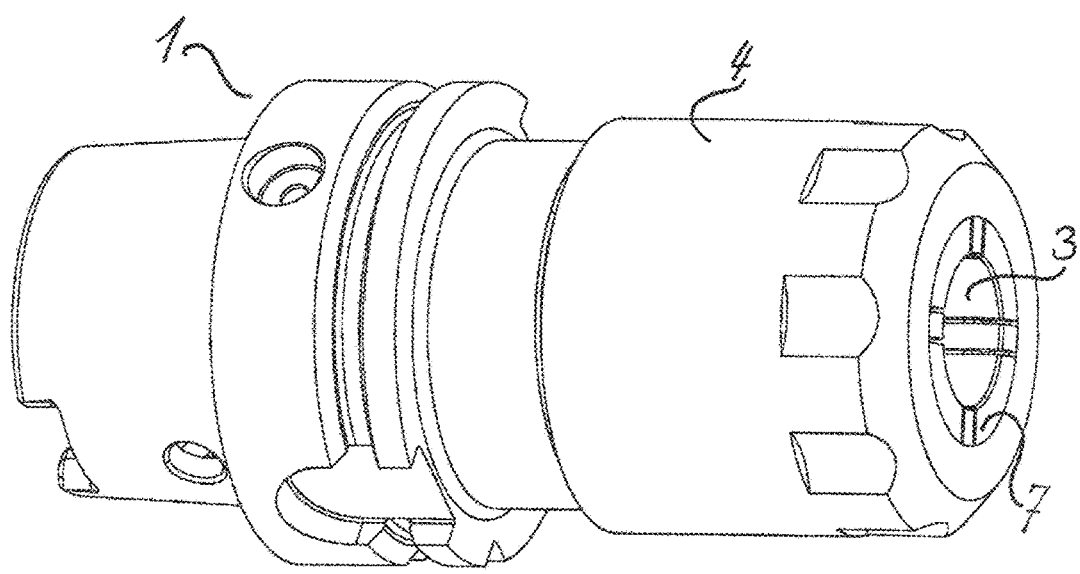
FIG. 2 is a 3D view of the collet chuck.

FIG. 2 is a three-dimensional illustration of the collet chuck according to the invention 1.

As in FIG. 1, the receiving sleeve 3 is driven into the chuck body 2 by tightening the screw cap 4, with the collar 7 protruding beyond the receiving sleeve 3 in the radial direction.

This view shows with particular clarity that a design according to the invention, with a small cone angle on the one hand and on the other, the permanent connection of the receiving sleeve 3 and screw cap 4 so that they are able to rotate relative to each other is essentially more compact than a conventional ER-collet chuck and at the same time, has a smaller interference contour. This effect becomes important particularly when chucking large shaft diameters.

FIGS. 4 through 10 show another exemplary embodiment of the invention for which separate protection is also claimed. That which has already been stated above, along with all of its options, applies to this exemplary embodiment so long as nothing to the contrary is expressly stated in the following description of the differences.

Figure 4:
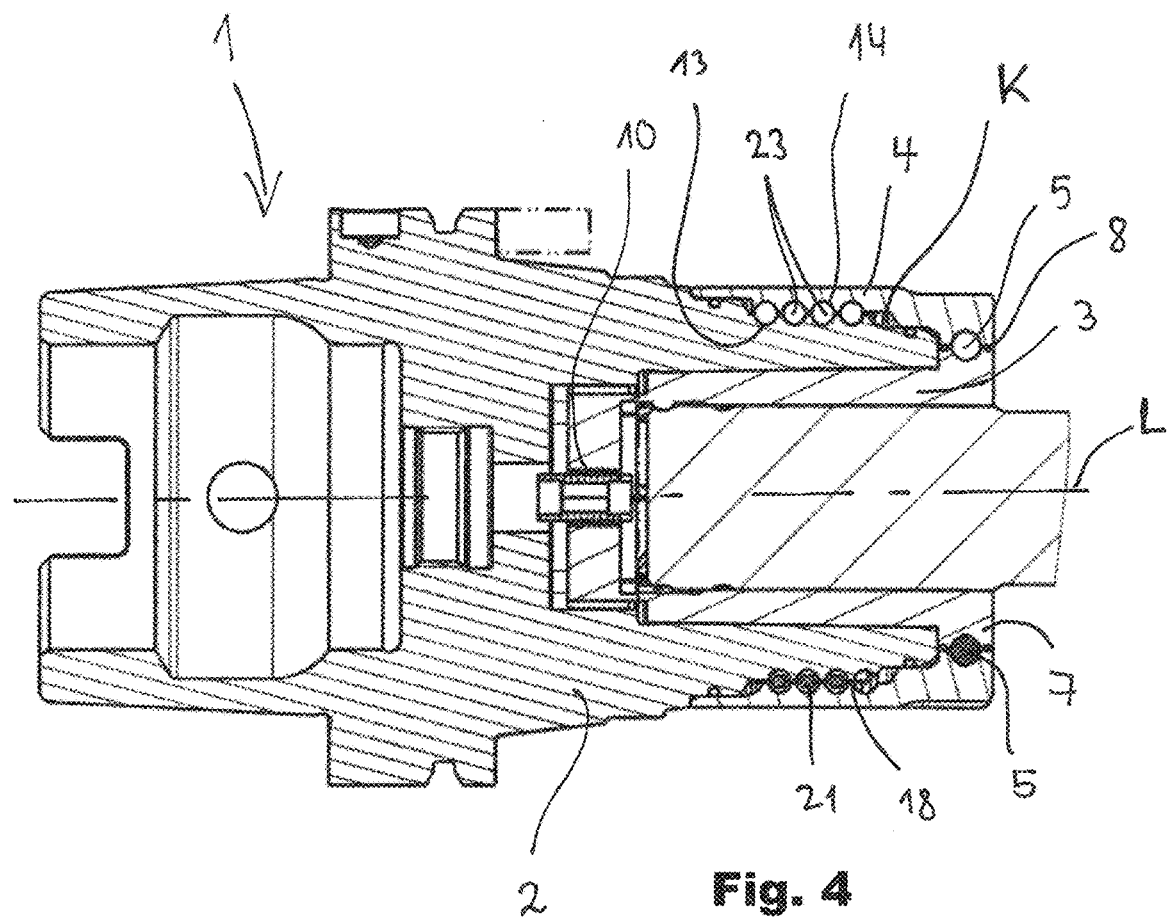
FIG. 4 is an overall sectional view of a second exemplary embodiment.
Figure 5:
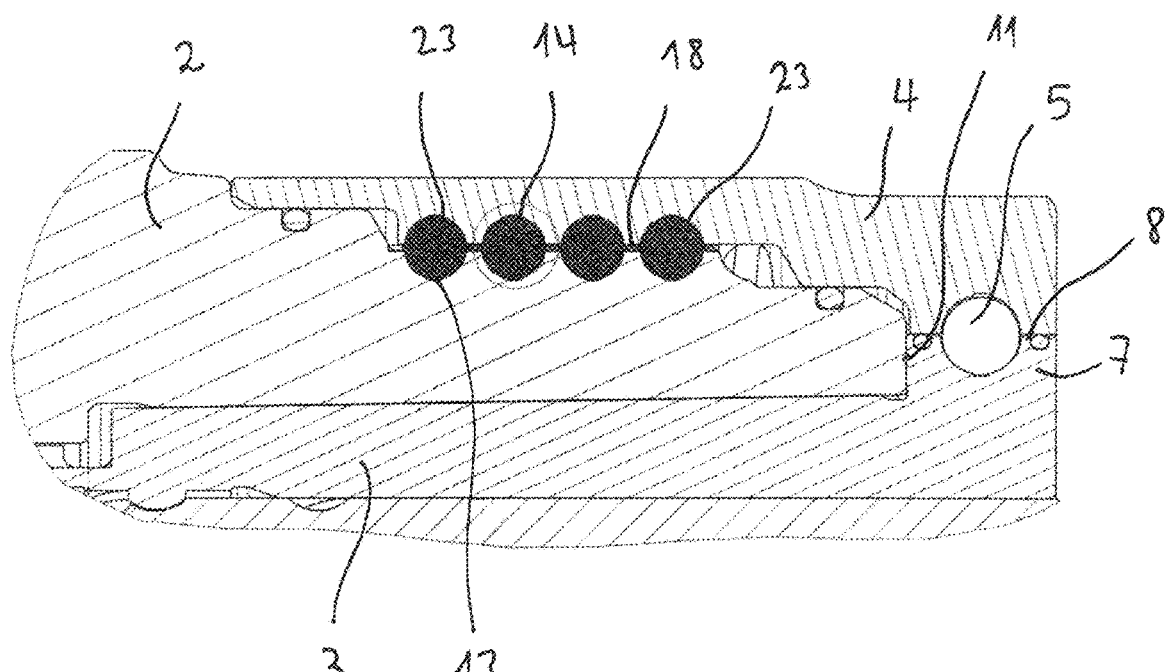
FIG. 5 is an enlarged partial section through a second embodiment.
Figure 11:
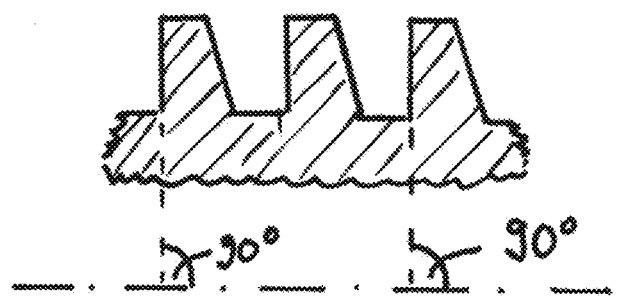
FIG. 11 shows a partial sectional view of a thread on a chuck body, wherein one of the thread flanks of the thread forms a 90° angle relative to the tool axis.

FIG. 4 shows this whole exemplary embodiment. In this case, the receiving sleeve and the screw cap are also connected to each other by means of rolling elements 5 in the manner described above. This figure also clearly shows how before and after the region of the rolling elements 5 in the direction of the longitudinal axis L, this connection is sealed in relation to the outside, preferably by means of an O-ring, as also shown in FIG. 5. In this case, the rolling elements 5 can be embodied in the form of balls or also in the form of rolling elements from the above-described, different type of arrangement.

The receiving sleeve 3 is built into the chuck body 2, as has been described above. By tightening the screw cap, the receiving sleeve is driven deeper into the conical seat and thus closed. This enables it to exert the necessary pressing force relative to the tool shaft inserted into it.

This exemplary embodiment differs from the preceding exemplary embodiment in that the screw cap travels with the aid of rolling elements 23 on a thread provided in the outer circumference of the chuck body 2, said rolling elements each being held in their proper, exact position by a rolling element cage 18. This prevents the inserted balls 23 from coming too close to one another and thus prevents an unwanted friction from occurring between the balls 23. As is readily apparent from FIG. 5, viewed in the direction of the longitudinal axis L, the screw cap 4 is sealed off from the outside in front of and behind the balls or rolling elements, preferably by means of an O-ring, as is shown in this Fig.

The flutes in the screw cap 4 and the chuck body 2 are embodied as shown in FIG. 3. In other words, they each have a recess 22, in which, even under load, no direct surface pressure occurs between the ball surface and the bottom of the flute. Any foreign matter or dirt that has penetrated can collect here without yielding a destructive effect of the kind that occurs when such particles are rolled over under load. The rolling element cage 18 best graphically illustrated in FIG. 7 is in this case composed of a base body 19, which has the shape of a cylinder. This cylinder is preferably composed of plastic and ideally, is thin-walled in the region of most of its circumferential surface. In this case, it then has a wall thickness or thickness D of preferably less than 1 mm, see FIG. 10. It is particularly advantageous if the D is so slight that the base body finally constitutes a kind of foil with a thickness of less than 0.5 mm. In this way, the rolling element cage 18 can change its shape to the required degree.

In order to nevertheless hold the individual rolling elements securely in their position, blocks 20 protrude beyond the base body of the rolling element cage 18 in a radially outward and radially inward direction. Each opening 21 (see FIG. 10, but with rolling elements inserted into the opening 21) of the rolling element cage 18, which is provided for a rolling element, is bordered by at least two blocks 20. The blocks 20 define the inner cross-section of the opening 21 on the inside and outside so that a rolling element 23 can be spread-inserted into the opening 21 and then remains there permanently and cannot inadvertently fall out of the rolling element cage 18, see FIG. 9. Each block 20 has a dimension in the radial direction that is preferably at least 2.5 times the thickness D of the base body of the rolling element cage, see FIG. 8.

Through the use of the above-described rolling element cage 18, the rolling element density can be significantly increased. Preferably, at least 40 or better still, at least 60 rolling elements 23 are used.

Preferably, each opening 21, viewed in the rotation direction, is allocated a block 20 before the rolling element 23 and a block 20 after the rolling element 23. The two blocks are on diametrically opposite sides of the opening 21. The blocks 20 naturally do not protrude beyond the rolling elements 23 in the radial direction.

As is readily apparent, the openings 21 are positioned one after another along at least one helix. Ideally, the rolling element cage 18 is thus equipped with rolling elements 23 along a helix that extends at least three times around its outer circumference.

In this exemplary embodiment, the rolling element cage 18 is accompanied by an entirely decisive advantage. With the opening and closing of the screw cap 4, it is specifically possible to move the rolling elements 23 beyond the end of the flute provided for accommodating them in the chuck body 2 and/or screw cap 4, in a region in which they lose the contact with the chuck body or screw cap or their flute, see the region labeled with the letter K in FIG. 4. The balls nevertheless maintain a definite position and are automatically threaded back into both of the flutes allocated to then when the screw cap 4 is turned again in the closing direction or opening direction. Because of this, another important factor in this exemplary embodiment is the blocks 20 that securely hold the rolling elements 23 in their position and not just spaced apart from one another, as would be the case in a normal rolling element cage. It should be noted that preferably, balls are used as the rolling elements 23.

Figure 12:
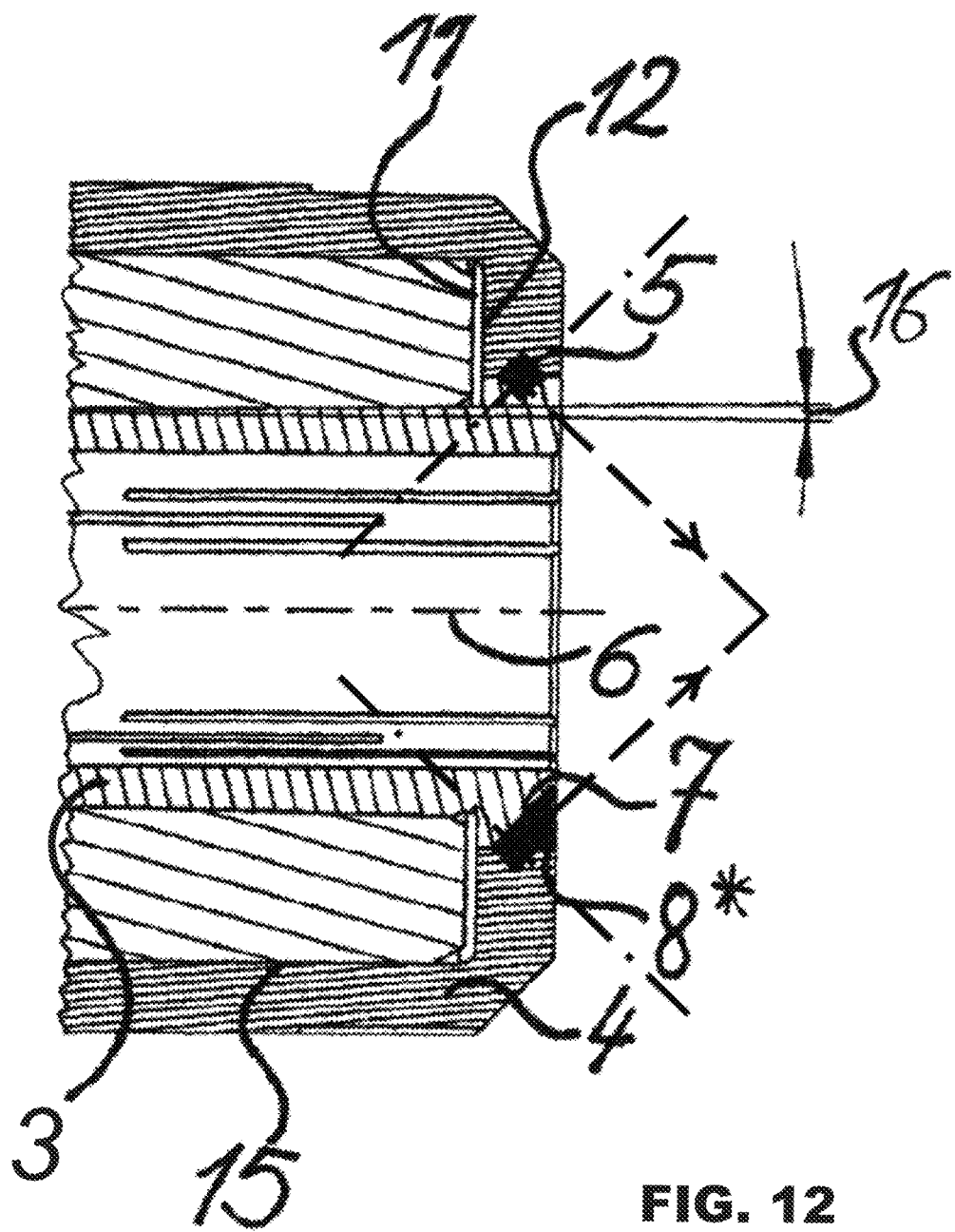
FIG. 12 shows FIG. 3 with another arrangement of rolling elements.

FIG. 12 shows a set of rolling elements in a V-shaped arrangement whose rolling elements are arranged so that the orthogonals to the rotational axes of the rolling elements only intersect with the longitudinal or working rotational axis of the chuck body on the outside of the chuck body. Each of the rolling elements 5 rotates around its rotational axis, which is depicted with a dot-and-dash line. The dashed line orthogonals to these rotational axes intersect with the axis 6 on the outside of the chuck body. The flow of force that is transmitted by means of form-fitting engagement from the screw cap to the receiving sleeve takes place in the arrow direction along the above-mentioned orthogonals.

REFERENCE NUMERAL LIST (1) collet chuck
(2) chuck body
(3) collet chuck
(4) screw cap
(5) rolling elements
(6) rotational axis
(7) collar of collet chuck
(8) outer circumference surface of collar
(8*) closure element for closing the installation opening of the rolling elements
(9) polygonal outer contour
(10) opening for length-adjusting screw
(11) end of chuck body
(12) end of screw cap
(13) chuck body thread
(14) screw cap thread
(15) mating surface
(16) cone angle
(17) through bore
(18) rolling element cage
(19) base body
(20) block
(21) opening for a rolling element
(22) recess
(23) rolling elements between chuck body and screw cap
(L) longitudinal axis
(K) region in which, during the opening or closing of the chuck, rolling elements lose contact on at least one side with the flute that guides them

The invention claimed is:

1. A collet chuck for chucking a cylindrical tool shaft comprising:
a chuck body, a receiving sleeve with a cylindrical bore, which is oriented on the diameter of the tool shaft that is to be chucked for including the tool in a nonpositive, frictional way, and a screw cap, which are matched to one another in such a way that by tightening the screw cap, the receiving sleeve can be driven into the chuck body so that it fixes the tool shaft in the collet chuck in a ready-to-operate fashion, the receiving sleeve being one-piece, the screw cap being one-piece, wherein the receiving sleeve and the screw cap are directly and permanently connected to each other and at the same time, are able to rotate relative to each other, wherein the receiving sleeve and the screw cap are supported against each other in rotary fashion by rolling elements, which each roll against the receiving sleeve and the screw cap, wherein the collet chuck has a set of rolling elements in a V-shaped arrangement whose rolling elements are arranged so that the orthogonals to the rotational axes of the rolling elements only intersect with the chuck longitudinal axis of the chuck body on the inside of the chuck body.

2. The collet chuck of claim 1, wherein the rolling elements form a roller bearing, with the aid of which the receiving sleeve holding a tool shaft can be pressed into the chuck body and pulled out from it again by screwing and unscrewing the screw cap.

3. The collet chuck of claim 1, wherein the rolling elements are arranged so that the receiving sleeve is automatically centered in the screw cap during the tightening of the screw cap.

4. The collet chuck of claim 1, wherein the rolling elements are installed between the receiving sleeve and the screw cap, without a bearing cage.

5. The collet chuck of claim 1, wherein the receiving sleeve has a collar that protrudes radially beyond the chuck body and on its outer circumference surface, the collar has a running track for the rolling elements.

6. The collet chuck of claim 5, wherein the receiving sleeve is not slit in the region in which the running track for the rolling elements is embodied on it.

7. The collet chuck of claim 1, wherein the receiving sleeve is rotationally secured relative to the chuck body through form-fitting engagement.

8. The collet chuck of claim 7, wherein at least one section that achieves a rotational securing has a non-round and/or polygonal outer contour or a locking groove or locking projection and the chuck body is embodied as complementary to it.

9. The collet chuck of claim 1, wherein the screw cap has an installation opening that is accessible from the outside of the screw cap for inserting rolling elements between the screw cap and the receiving sleeve.

10. The collet chuck of claim 9, wherein the installation opening is closed by means of a screw, a press-fitted plug, or a closure that is glued into place or thermally fastened.

11. The collet chuck of claim 1, wherein in its end oriented away from the screw cap, the receiving sleeve has an opening for a length-adjusting screw.

12. The collet chuck of claim 1, wherein the receiving sleeve has a collar, which in the chucked state, rests flat against the end of the chuck body and/or the screw cap has an inner end, which, in the chucked state, rests flat against the end of the chuck body.

13. The collet chuck of claim 1, wherein the screw cap can be screwed to the chuck body by means of a multi-start thread and/or a thread embodied as a trapezoidal thread.

14. The collet chuck with a trapezoidal thread according to claim 13, wherein at least one of the two thread flanks of the trapezoidal thread forms an angle of approximately 90° relative to the tool axis.

15. The collet chuck of claim 1, wherein rolling elements are held in a rolling element cage, which is positioned between the outer circumference surface of the chuck body and the inner circumference surface of the screw cap.

16. The collet chuck of claim 15, wherein the rolling element cage is a cylindrical ring that has openings situated one after another along at least one helix, each provided for a respective rolling element.

17. The collet chuck of claim 15, wherein on two opposing sides of an opening for a rolling element, the rolling element cage has blocks that protrude in the radial direction relative to a base part of the rolling element cage and form a boundary through which a rolling element can be spread-inserted into an opening of the rolling element cage.

18. The collet chuck of claim 17, wherein each opening is allocated a pair of blocks, one of which is situated after the rolling element in the rotation direction and another of which is situated before the rolling element.

19. The collet chuck of claim 15, wherein the rolling element cage is equipped with rolling elements along a helix that extends at least three times around its outer circumference.

20. The collet chuck of claim 15, wherein a base body of the rolling element cage is thin-walled and has a thickness (D) of no more than 2 mm.

21. The collet chuck of claim 15, wherein the entire rolling element cage is composed of plastic.

22. The collet chuck of claim 1, wherein at its outer circumference between its end and an external thread for the screwing-on of the screw cap, the chuck body has a damping element, which encloses the chuck body in annular fashion at its outer circumference.

23. The collet chuck of claim 1, wherein at its end oriented toward the screw cap, the chuck body has a damping element.

24. The collet chuck of claim 1, wherein at its outer circumference, the chuck body has a mating surface, which interacts with a corresponding counterpart mating surface on the inside of the screw cap and as a result, centers the screw cap relative to the chuck body in a form-fitting way.

25. The collet chuck of claim 1, wherein at least one of the receiving sleeve, the screw cap or the chuck body, at least in the region in which they come into form-fitting contact with one another, is provided with at least one of a sliding coating or a wear-protection coating to improve the mechanical properties.

26. The collet chuck of claim 25, wherein the outer region of the receiving sleeve section and/or the inner region of the tool holder is provided with an electrically non-conductive coating.

27. The collet chuck of claim 1, wherein the receiving sleeve has at least two different types of slit, in particular slits that differ in terms of their length in the direction parallel to the longitudinal axis of the receiving sleeve.

28. The collet chuck of claim 1, wherein a conical surface by means of which the receiving sleeve is compressed by the chuck body has a cone angle of 0.5° to 4°.

29. The collet chuck of claim 1, wherein the chuck body has a receiving sleeve socket with an inner cone whose cone angle is less than or equal to that of the outer cone of the receiving sleeve.

30. The collet chuck of claim 1, wherein the receiving sleeve socket of the chuck body has at least one groove that makes it possible to dispense coolant and/or lubricant into the working region of the tool through the tool holder.

31. A working unit for a machine tool, composed of a collet chuck according to claim 1 in which a tool with a cylindrical tool shaft is chucked.

32. A receiving sleeve assembly for the collet chuck according to claim 1, composed of the receiving sleeve and the screw cap.

33. The receiving sleeve assembly of claim 32, wherein an outer contour is embodied as non-round and/or polygonal over the entire length and the receiving sleeve assembly can have different sections with differently embodied polygons.

34. A collet chuck for chucking a cylindrical tool shaft comprising: a chuck body, a receiving sleeve, and a screw cap, which are matched to one another in such a way that by tightening the screw cap, the receiving sleeve can be driven into the chuck body so that the tool shaft is fixed in the collet chuck in a ready-to-operate fashion, wherein the receiving sleeve and screw cap are permanently connected to each other and at the same time, are able to rotate relative to each other; wherein in a region between an external thread of the chuck body for screwing on the screw cap and a chuck body end oriented toward the screw cap, an outer diameter of the chuck body tapers toward said chuck body end.

35. The collet chuck of claim 34, wherein the inner circumference of the screw cap is adapted so that it is complementary to the tapering of the chuck body.

36. A collet chuck for chucking a cylindrical tool shaft comprising: a chuck body, a receiving sleeve, and a screw cap, which are matched to one another in such a way that by tightening the screw cap, the receiving sleeve can be driven into the chuck body so that the tool shaft fixed in the collet chuck in a ready-to-operate fashion, wherein the receiving sleeve and screw cap are permanently connected to each other and at the same time, are able to rotate relative to each other; wherein the receiving sleeve has a form-fitting pull-out prevention element which can interact with a complementary pull-out prevention element on the tool shaft, thus providing a pull-out prevention for the tool.

37. A tool-chucking system, comprising: a collet chuck for chucking a cylindrical tool shaft having a chuck body, and at least two receiving sleeve assemblies composed of a receiving sleeve and a screw cap that are permanently connected to each other and at the same time, are able to rotate relative to each other; wherein the chuck body and the receiving sleeve assemblies are matched to one another in such a way that by tightening the screw cap, the receiving sleeve can be driven into the chuck body so that the tool shaft is fixed in the collet chuck in a ready-to operate fashion; wherein the receiving sleeve assemblies have receiving sleeves whose tool-chucking regions have different inner diameters.

38. A collet chuck for chucking a cylindrical tool shaft comprising:
a chuck body, a receiving sleeve with a cylindrical bore, which is oriented on the diameter of the tool shaft that is to be chucked for including the tool in a nonpositive, frictional way, and a screw cap, which are matched to one another in such a way that by tightening the screw cap, the receiving sleeve can be driven into the chuck body so that it fixes the tool shaft in the collet chuck in a ready-to-operate fashion, the receiving sleeve being one-piece, the screw cap being one-piece, wherein the receiving sleeve and the screw cap are directly and permanently connected to each other and at the same time, are able to rotate relative to each other,
wherein the receiving sleeve and the screw cap are supported against each other in rotary fashion by rolling elements, which each roll against the receiving sleeve and the screw cap, wherein:
the collet chuck has a set of rolling elements in a V-shaped arrangement whose rolling elements are arranged so that the orthogonals to the rotational axes of the rolling elements only intersect with the chuck longitudinal axis of the chuck body on the inside of the chuck body, and
the collet chuck has a set of rolling elements in a V-shaped arrangement whose rolling elements are arranged so that the orthogonals to the rotational axes of the rolling elements only intersect with the longitudinal axis of the chuck body on the outside of the chuck body.

39. The collet chuck of claim 38, wherein the rolling elements form a roller bearing, with the aid of which the receiving sleeve holding a tool shaft can be pressed into the chuck body and pulled out from it again by screwing and unscrewing the screw cap.

40. The collet chuck of claim 38, wherein the rolling elements are arranged so that the receiving sleeve is automatically centered in the screw cap during the tightening of the screw cap.

* * * * *